United States Patent
Hsu et al.

(10) Patent No.: US 7,825,363 B2
(45) Date of Patent: Nov. 2, 2010

(54) MICRO LENS ARRAY UNIT HAVING AT LEAST ONE OF FIRST AND SECOND MICRO LENS ARRAYS MOVABLE FOR CHANGING THE EFFECTIVE FOCAL LENGTH OF THE MICRO LENS ARRAY UNIT AND LIQUID CRYSTAL DISPLAY PROJECTION DEVICE USING SAME

(75) Inventors: Chien-Wen Hsu, Taipei Hsien (TW); Po-Lin Wang, Taipei-Hsien (TW); Ching-Te Chu, Taipei Hsien (TW); Yu-Shan Chou, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 389 days.

(21) Appl. No.: 12/134,219

(22) Filed: Jun. 6, 2008

(65) Prior Publication Data
US 2009/0066917 A1    Mar. 12, 2009

(30) Foreign Application Priority Data
Sep. 12, 2007    (CN) .......................... 2007 1 0201672

(51) Int. Cl.
H01L 27/00    (2006.01)

(52) U.S. Cl. ................................. 250/208.1; 250/201.2

(58) Field of Classification Search ............... 250/208.1, 250/239, 216, 201.2; 353/33–38, 20; 349/5–8, 349/95, 187; 359/619–622
See application file for complete search history.

(56) References Cited

U.S. PATENT DOCUMENTS 6,204,895 B1 *    3/2001    Nakamura et al. ............. 349/5
2004/0184155 A1    9/2004    Kornblit et al.

FOREIGN PATENT DOCUMENTS

JP    2007212716 A    8/2007

\* cited by examiner

*Primary Examiner*—Que T Le
(74) *Attorney, Agent, or Firm*—Zhigang Ma

(57) ABSTRACT

An exemplary MLA unit for use in a projection device is disclosed. The projection device includes an LCD panel. The LCD panel includes a number of pixels each having an opening. The MLA unit includes a first MLA, and a second MLA. The first MLA includes a number of first micro lenses each configured for focusing incident light into the opening of a respective pixel of the LCD panel. The second MLA includes a number of second micro lenses each aligned with a respective first micro lens of the first MLA so as to form a micro lens system. The second MLA is movable so as to change the effective focal length of the lens systems.

17 Claims, 3 Drawing Sheets

MICRO LENS ARRAY UNIT HAVING AT LEAST ONE OF FIRST AND SECOND MICRO LENS ARRAYS MOVABLE FOR CHANGING THE EFFECTIVE FOCAL LENGTH OF THE MICRO LENS ARRAY UNIT AND LIQUID CRYSTAL DISPLAY PROJECTION DEVICE USING SAME

BACKGROUND

1. Technical Field

The invention relates to projection technology and, in particular, relates to a micro lens array (MLA) unit used in a liquid crystal display (LCD) projection device, and an LCD projection device.

2. Description of the Related Art

LCD projectors, especially 3LCD projectors, are capable of reproducing bright, natural images that are easy on eyes, and therefore pleasant to watch. These LCD projectors typically employ an LCD panel (three in 3LCD type) for image generation, and the brightness of the reproduced images is mainly determined by the aperture ratio of the LCD panel (the greater the aperture ratio, the higher the brightness). A MLA unit is normally used to increase the brightness. The MLA includes a number of micro lenses, each of which is dedicated to focus incident light into the opening of respective pixels of the LCD panel, thereby increasing the aperture ratio of the LCD panel. However, as the incident light is concentrated by the MLA, peripheral aberrations such as distortion may become greater. In other words, the MLA may decrease the contrast of the reproduced images. It has been challenging to achieve both satisfactory brightness and desirable contrast.

Therefore, it is desirable to provide a MLA unit, and an LCD projection device, which can overcome the above mentioned problems.

SUMMARY

In an exemplary embodiment, a MLA unit used in a projection device is disclosed. The projection device includes an LCD panel. The LCD panel includes a number of pixels each having an opening. The MLA unit includes a first MLA, and a second MLA. The first MLA includes a number of first micro lenses each configured for focusing incident light into the opening of a respective pixel of the LCD panel. The second MLA includes a number of second micro lenses each aligned with a respective first micro lens of the first MLA so as to form a micro lens system. The second MLA is movable so as to change the effective focal length of the lens systems.

BRIEF DESCRIPTION OF THE DRAWINGS

Many aspects of the present MLA unit and projection device should be better understood with reference to the accompanying drawings. The components in the drawings are not necessarily drawn to scale, the emphasis instead being placed upon clearly illustrating the principles of the present MLA unit and projection device. Moreover, in the drawings, like reference numerals designate corresponding parts throughout the several views.

DETAILED DESCRIPTION OF THE EMBODIMENTS

Embodiments of the present MLA unit and LCD projection device will now be described in detail with reference to the drawings.

Figure 1:
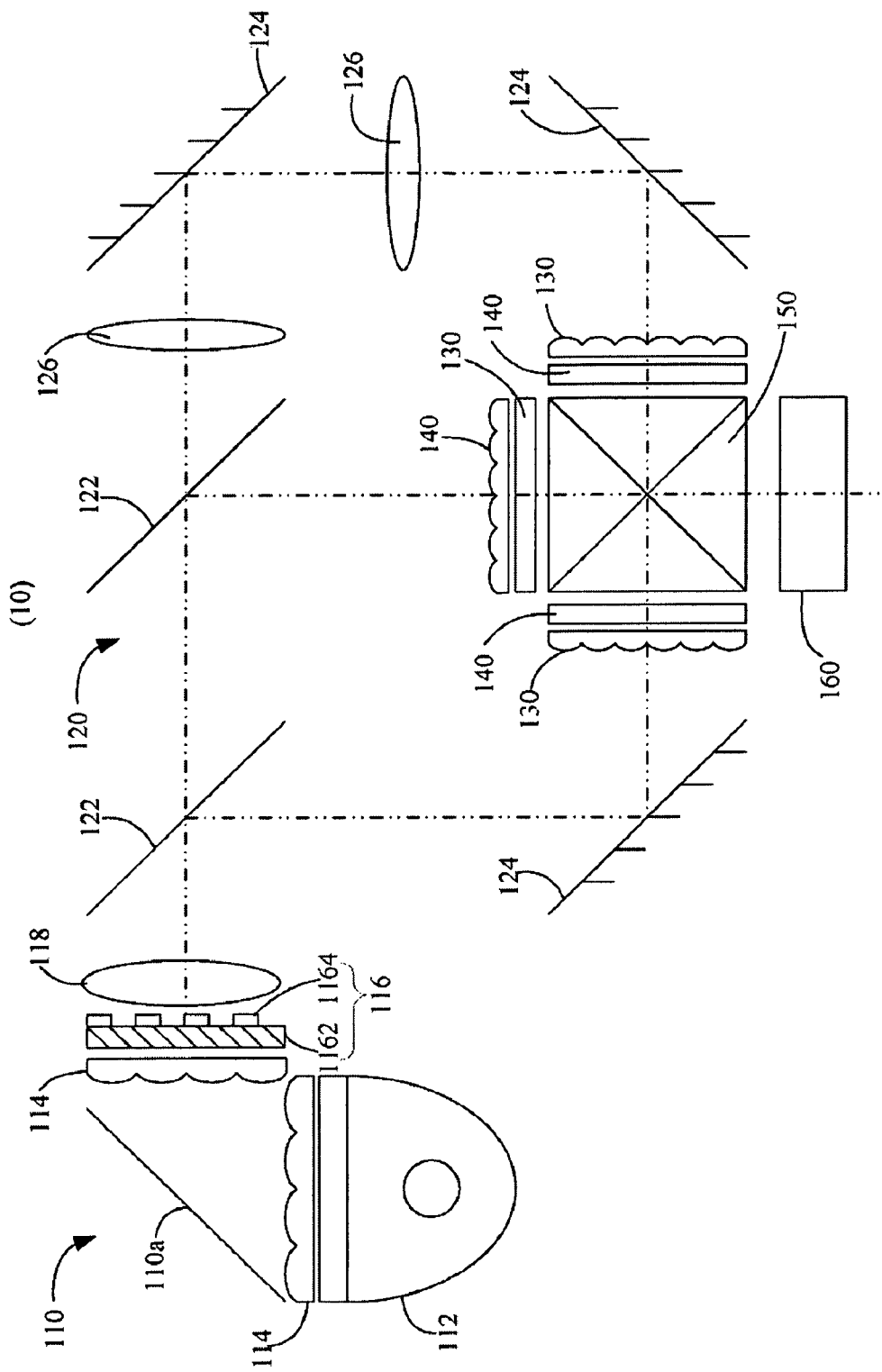
FIG. 1 is a schematic view of an LCD projection device that includes three MLA units and three corresponding LCD panels, according to an exemplary embodiment.

Referring to FIG. 1, a 3LCD projection device 10, according to an exemplary embodiment, includes an illumination unit 110, a color splitting system 120, three MLA units 130, three LCD panels 140, a prism 150, and a projection lens 160. The illumination unit 110 is configured to provide illumination. The color splitting system 120 is placed in the path of the light from the illumination unit 110 to separate the light into three beams of color light, e.g., red (R), green (G), and blue (B), and is configured to direct each beam of color light along a respective color channel/path. The three MLA units 130 and the three LCD panels 140 are set in the paths of the three beams of color light, respectively, in the color splitting system 120. The MLA units 130 are configured to increase the aperture ratio of the three LCD panels 140 respectively. The LCD panels 140 are configured to modulate the three beams of color light into three color components, e.g., R, G, and B, of visual images, based on input signals. The prism 150 such as an X-cube is configured to combine the three modulated color components from the three LCD panels 140 into the visual images. The projection lens 160 is configured to project the combined visual images from the prism 150 onto a screen or the like.

The illumination unit 110 includes a short arc lamp 112, two lens arrays 114, a polarization converter 116, and a condensing lens 118. The short arc lamp 112, such as a high pressure mercury lamp, a metal halide lamp, or a xenon lamp, is configured to generate light. The two lens arrays 114, the polarization converter 116, and the condensing lens 118 are set in the path of the light generated by the short arc lamp 112. The two lens arrays 114, also known as "fly's eye lens arrays", are configured to homogenize the generated light form the short arc lamp 112. The polarization converter 116 typically includes a polarization beam splitter (PBS) array 1162, and a number of half-wave plates 1164. The PBS array 1162 is configured for splitting the homogenized light from the lens arrays 114 into p-polarized light. The half-wave plates 1164 are attached at predetermined points on the PBS array 1162 so that p-polarized light through the PBS array 1162 is converted into s-polarized light. The condensing lens 118 is configured to condense the s-polarized light from the polarization converter 116 to form s-light illumination. The illumination unit 110 may further includes a reflective mirror 110a, interposed between the two lens arrays 114, for example, configured to reduce the size of the illumination unit 110.

The color splitting system 120 includes a series of color splitting members 122 such as dichroic mirrors or dichroic prisms, and light steering members 124 such as reflective mirrors or prisms. The color splitting members 122 and the light steering members 124 are arranged so as to have the capability of color splitting and light steering. More specifically, the color splitting system 120 can further include two relay lenses 126 for light relay.

Figure 2:
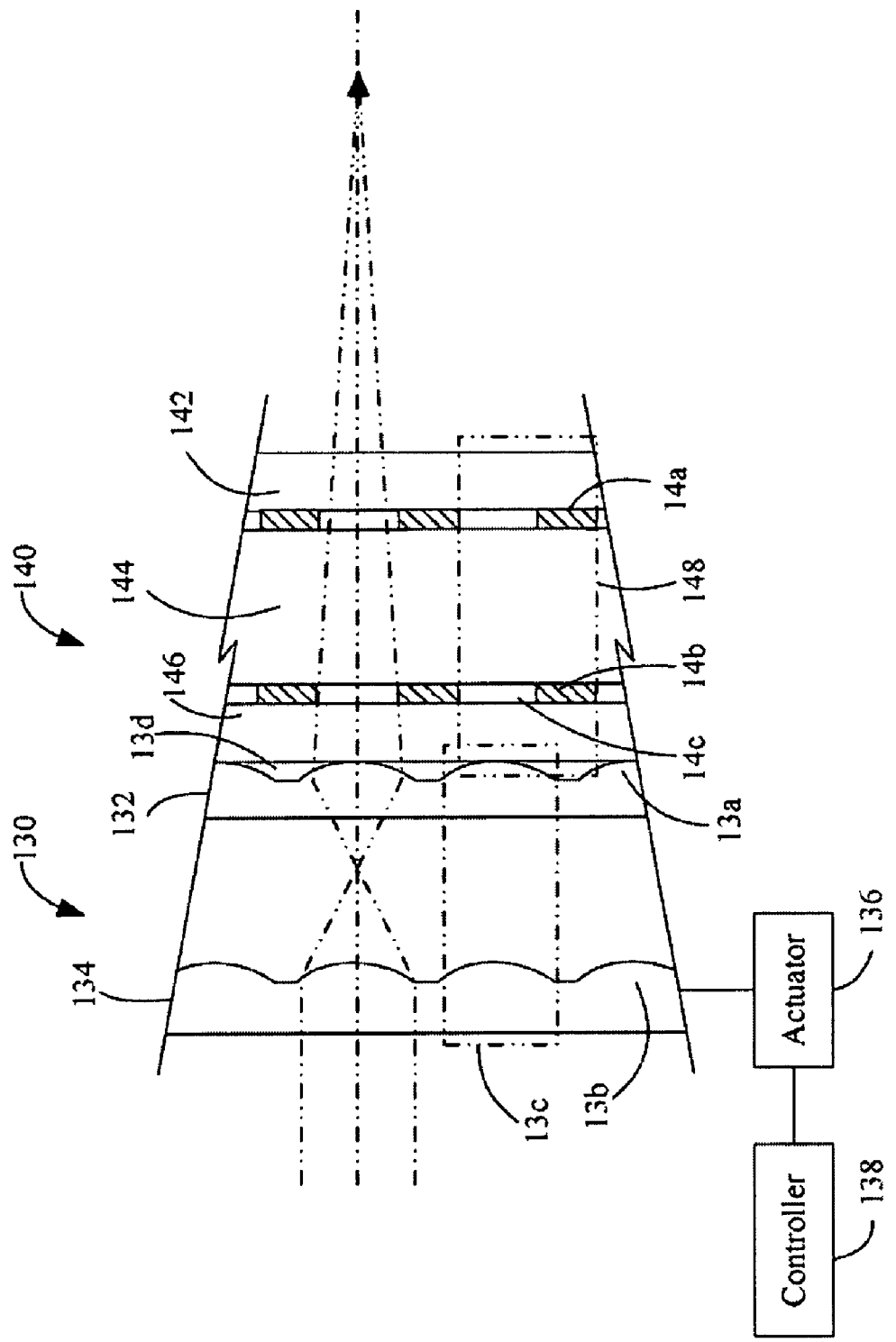
FIG. 2 is an enlarged, sectional, schematic view of one of the MLA units and the corresponding LCD panel of FIG. 1.

Referring to FIG. 2, the LCD panel 140 is a thin film transistor (TFT) LCD panel, and typically includes a TFT substrate 142 (ITO glass), a liquid crystal layer 144, and an opposite substrate 146. The TFT substrate 142 and the opposite substrate 146 seal the liquid crystal layer 144. This LCD panel 140 is divided into a number of pixels 148, each of which has a TFT 14a, formed on the TFT substrate 142 and acting as a switch of the corresponding pixel 148. In addition, a black matrix 14b (nontransparent portion) is patterned on the opposite substrate 146 so as to protect the TFTs 14a from light, but leaving an opening 14c (transparent portion) in each pixel 148.

The MLA unit 130 includes a first MLA 132, a second MLA 134, an actuator 136, and a controller 138. The first MLA 132 includes a number of first micro lenses 13a, each of which is configured to focus incident light into the opening 14a of a respective pixel 148 of the LCD penal 140. The second MLA 134 also includes a number of second micro lenses 13b, each of which is aligned with a respective first micro lens 13a so as to form a micro lens system 13c. The controller 138 is configured for controlling the actuator 136 to force the second MLA 134 to move, along the optical axis thereof, thereby changing the effective focal length of the micro lens systems 13c.

In this embodiment, the first and second MLA 132, 134 are made of quartz crystal. The first MLA 132 is attached to the opposite substrate 146 using adhesive agent 13d, and the second MLA 134 are movably set at the light incident side of the LCD panel 140. The actuator 136 and the controller 138 are provided by a micro-electro-mechanical system (MEMS).

Figure 3:
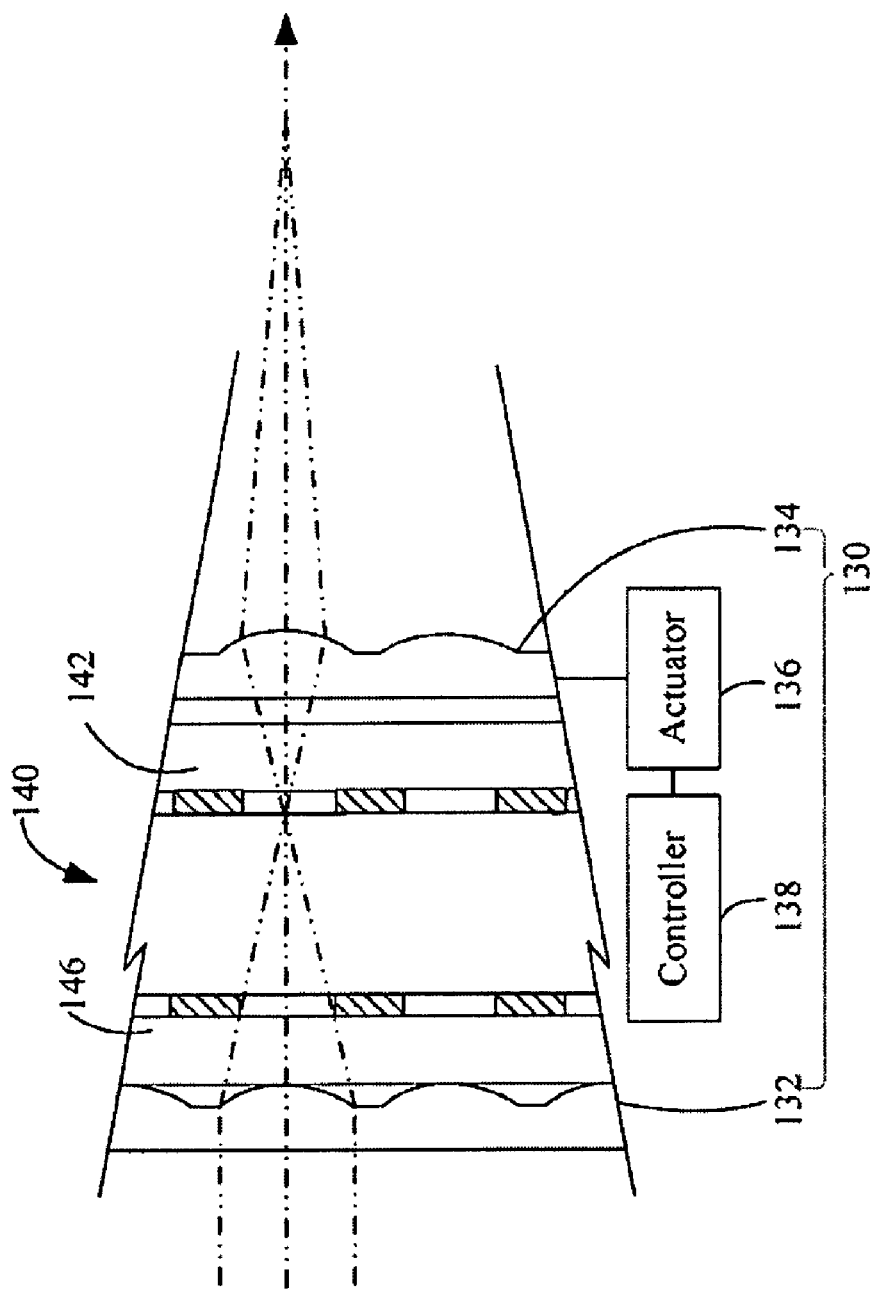
FIG. 3 is an enlarged, sectional, schematic view of a MLA unit and a corresponding LCD panel, according to another exemplary embodiment.

Alternatively, both the first MLA 132 and the second MLA 134 can be movably set too; or only the first MLA 132 is movably set. The second MLA 134 can be placed at the light emitting side of the LCD panel 140 (see FIG. 3). In addiction, this MLA unit 130 can be applied to a single-panel LCD projector (typically including an illumination unit, a MLA unit, an LCD panel, and a projection lens) too.

When the quotient of the effective focal length divided by the bore of a lens employed in the LCD projection device, a.k.a. the F value, becomes smaller, the brightness of reproduced images increases, but the contrast thereof decreases. Conversely, if the F value increases, the brightness suffers, but the contrast improves. In the above-mentioned embodiments, the lens systems 13c of the MLA unit 130 are configured to adjust the F value thereof so as to obtain a desirable brightness and contrast.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A micro lens array unit for use in a projection device, the projection device comprising a liquid crystal display panel for image generation, the liquid crystal display panel comprising a plurality of pixels each having an opening, the micro lens array unit comprising:
a first micro lens array comprising a plurality of first micro lenses each configured for focusing incident light into the opening of a respective pixel of the liquid crystal display panel; and
a second micro lens array comprising a plurality of second micro lenses each aligned with a respective first micro lens of the first micro lens array so as to form a micro lens system, at least one of the first and second micro lens arrays being movable so as to change the effective focal length of the micro lens systems.

2. The micro lens array unit as claimed in claim 1, wherein the first and second micro lens arrays are made of quartz crystal.

3. The micro lens array unit as claimed in claim 1, further comprising an actuator, and a controller, the controller being configured for controlling the actuator to force at least one of the first and second micro lens arrays to move.

4. The micro lens array unit as claimed in claim 3, wherein the actuator and the controller are provided by a micro-electro-mechanical system.

5. A projection device comprising:
a liquid crystal display panel for image generation, comprising a plurality of pixels each having an opening;
a micro lens array unit for increasing the aperture ratio of the liquid crystal display panel, comprising:
a first micro lens array comprising a plurality of first micro lenses each configured for focusing incident light into the opening of a respective pixel of the liquid crystal display panel; and
a second micro lens array comprising a plurality of second micro lenses each aligned with a respective first micro lens of the first micro lens array so as to form a micro lens system, at least one of the first and second micro lens arrays being movable so as to change the effective focal length of the micro lens systems.

6. The projection device as claimed in claim 5, wherein the liquid crystal display panel is a thin film transistor liquid crystal display panel.

7. The projection device as claimed in claim 5, wherein the first micro lens array is attached to the liquid crystal display panel using adhesive agent, and the second micro lens array being movable.

8. The projection device as claimed in claim 5, wherein the second micro lens array is placed at the light incident side of the liquid crystal display panel.

9. The projection device as claimed in claim 5, wherein the second micro lens array is placed at the light emitting side of the liquid crystal panel.

10. The projection device as claimed in claim 5, wherein the first and second micro lens arrays are made of quartz crystal.

11. The projection device as claimed in claim 5, wherein the micro lens array unit further comprises an actuator and a controller, the controller being configured for controlling the actuator driving at least one of the first and second micro lens arrays to move.

12. The projection device as claimed in claim 11, wherein the actuator and the controller are provided by a micro-electro-mechanical system.

13. The projection device as claimed in claim 5, further comprising:
an illumination unit for generating light;
a color splitting system capable of splitting light from the illumination unit into three beams of color light, and directing each beam of color light to move along a respective path;
another two micro lens array units and two liquid crystal display panels, each micro lens array unit and a corresponding liquid crystal display panel being placed in the path of a respective beam of color light, each liquid crystal display panel being capable of modulating a respective beam of color light into a color component of an image based on input signals;
a prism for combining the modulated color components into the image; and
a projection lens for projecting the image.

14. The projection device as claimed in claim 13, wherein the illumination unit comprises:
  a short arc lamp for generating light;
  two lens arrays capable of homogenizing the generated light from the short arc lamp; a polarization converter capable of converting the homogenized light from the two lens arrays into polarized light; and
  a condensing lens for condensing the polarized light from the polarization converter.

15. The projection device as claimed in claim 13, wherein the color splitting system comprises:
  a plurality of color splitting members for splitting light from the illumination unit into the three beams of color light; and
  a plurality of light directing members for directing each beam of color light to move along the respective path.

16. The projection device as claimed in claim 13, wherein the prism is an X-cube.

17. The projection device as claimed in claim 14, wherein the illumination unit further comprises a reflective mirror interposed between the two lens arrays.

* * * * *